May 17, 1966     D. F. STEWART     3,251,767
SOLVENT EXTRACTION UNIT AND OPERATION THEREOF
Filed Feb. 1, 1963

INVENTOR.
D. F. STEWART
BY *Young and Quigg*
ATTORNEYS

United States Patent Office 3,251,767
Patented May 17, 1966

3,251,767
SOLVENT EXTRACTION UNIT AND
OPERATION THEREOF
Dan F. Stewart, Phillips, Tex., assignor to Phillips Petroleum Company, a corporation of Delaware
Filed Feb. 1, 1963, Ser. No. 255,448
11 Claims. (Cl. 208—311)

This invention relates to solvent extraction. In one aspect this invention relates to an improved method for carrying out a solvent extraction operation. In another aspect this invention relates to an improved apparatus for carrying out a solvent extraction operation.

Generally speaking, solvent extraction operations are well known in the art. Ordinarily, in one form of operation, a liquid-liquid extraction is accomplished by feeding a material to be extracted, that is, one in which there are present at least two different chemical entities which have different solubilities or preferences in the presence of each other or a solvent, into a solvent extraction zone in which the material is contacted with a solvent, usually in countercurrent flow. At one end of the zone, there is removed a raffinate portion or a portion which represents that chemical entity which is not as soluble in the solvent as the other and an extract phase which contains said other entity.

In order to improve the selectivity and efficiency of such operations, it is frequently desirable to maintain a temperature differential between the top and bottom regions of the extraction tower so as to increase solvent selectivity. This is particularly true when extracting a hydrocarbon oil containing aromatic and nonaromatic constituents and it is desired to separate said aromatic from said nonaromatic constituents. With most selective solvents, decreasing the temperature at which the extraction is carried out will increase the selectivity of the solvent for aromatics.

A temperature differential can be maintained in a solvent extraction tower in a number of different ways. One method which is commonly employed, when utilizing a solvent which is heavier than the oil being extracted, is to cool the bottom or extract phase region of the tower. This cooling can be accomplished by cooling coils situated in the extract phase region or bottom of the tower. Said cooling can also be accomplished by cooling the oil charge, especially when the oil is introduced into the lower portion of the extraction tower. Another method comprises withdrawing extract phase from the lower portion of the extraction tower and passing said withdrawn extract phase to a separate chiller wherein it is cooled and then returned to the tower. The latter method is usually preferred when it is desired to maintain a maximum temperature differential possible between the top and bottom of the tower. For example, in the solvent extraction of a hydrocarbon oil to produce an extract phase having a high concentration of aromatics it is desirable to cool said extract phase to the lowest possible practical temperature.

The particular method of cooling which is employed will depend upon the oil being extracted and the desired temperature differential. The wax content of the oil being extracted limits the temperature to which the bottom or extract phase region of the tower can be cooled without encountering wax deposition problems and thus limits the temperature differential which can be maintained between the top and bottom regions of the tower. Low wax content oils can be chilled to lower temperatures before encountering problems of wax deposition within or upon the cooling or other surfaces of the chiller means incorporated in the extraction unit. Thus, with a low wax content oil, coils in the bottom of the tower or cooling of the oil charge itself are frequently employed. With higher wax content oils it is frequently preferred to withdraw the extract phase, cool same in a separate chiller, and then return the cooled extract phase to the tower. The problem of wax or other hydrocarbon deposition in the lower or extract region of a solvent extraction tower is solved in a very convenient manner by the method disclosed in U.S. Patent 2,764,522, issued September 25, 1956, to G. R. Hettick. According to Hettick, an anti-fouling oil is admixed with the extract phase prior to chilling same. Said anti-fouling oil prevents deposition of wax and/or other hydrocarbon solids and is effective to remove deposits of same which have already been laid down. The method of Hettick can be used with all oils. However, as will be apparent to those skilled in the art in view of this disclosure, and particularly the following portion thereof, the present invention, in one aspect at least, provides an improvement on the method of Hettick.

Even when deposition of wax and/or other hydrocarbon solids is no problem in the extract phase or lower region of the extraction tower, either as a result of low concentration of wax in the extract phase or by the use of the method of said Hettick patent to avoid wax deposition, deposition can still occur in the upper or raffinate region of the extraction tower. This is due to the higher concentration and/or type of wax in the raffinate phase which results in higher cloud and pour points on said raffinate phase. Not only is there a higher concentration of wax in the raffinate phase, but said wax is also more paraffinic and has higher cloud and pour points than the wax in the extract phase. In such instances, the upper or raffinate region of the tower waxes up and the throughput of the unit is drastically reduced or the unit becomes inoperable. It is then necessary to shut the unit down and remove the deposited wax or waxy materials by circulation of hot solvent or some other means. This results in a loss of valuable operating time. To avoid such difficulties the tower is operated at higher temperatures than desirable with resultant poor solvent selectivity, loss of extraction into the raffinate, and over-all inefficient operation.

In modern petroleum refineries a solvent extraction unit is an important and valuable tool for extracting cycle oils obtained from thermal and catalytic cracking units. Said cycle oils are separated into aromatic and nonaromatic fractions. The nonaromatic fraction is a premium charging stock for catalytic cracking and the aromatic fraction is a premium charging stock for the production of carbon black. Thus, loss of extract into the raffinate, as described above, is a double-edged sword economically. A penalty is imposed upon the value of said raffinate fraction as charging stock for catalytic cracking, and loss of aromatics into the raffinate represents a loss of valuable extract product. To avoid this double loss it is desirable to operate the solvent extraction tower with a maximum temperature differential between the top and bottom regions thereof. With many oils this cannot be done because of the waxing difficulties described.

The present invention provides a method and apparatus for solving the above-described problems. I have found that said problems can be solved, the above difficulties eliminated, and still maintain the desired maximum temperature differential, by measuring the cloud point of the raffinate phase and maintaining the temperature of the raffinate phase portion of the extraction tower above said cloud point. Thus, broadly speaking, the present invention comprises measuring the cloud point of the raffinate phase from an extraction tower and controlling the temperature of the raffinate phase portion in the extraction tower in accordance with said measurement.

An object of this invention is to provide an improved method for carrying out a solvent extraction operation. Another object of this invention is to provide an improved apparatus for carrying out a solvent extraction operation. Still another object of this invention is to provide a control system for a solvent extraction operation or column. Other aspects, objects, and advantages of the invention will be apparent to those skilled in the art in view of this disclosure.

Thus, according to the invention, there is provided a solvent extraction operation which comprises: introducing an oil into a solvent extraction zone; introducing a selective solvent into said zone; forming in said zone and withdrawing therefrom a raffinate phase and an extract phase; measuring the cloud point of said raffinate phase; and controlling the temperature of said introduced selective solvent responsive to said cloud point measurement.

Referring now to said drawings, the invention will be more fully explained. It is to be understood that said drawings are diagrammatic in nature. Many valves, pressure gauges, pumps, etc., not necessary for explaining the invention to those skilled in the art, have been omitted so as to simplify said drawings. All of the individual apparatus elements shown in said drawings are commercially available conventional equipment. With respect to apparatus, the present invention resides in combinations and arrangements of said elements to obtain the improved results as described herein.

Figure 1:
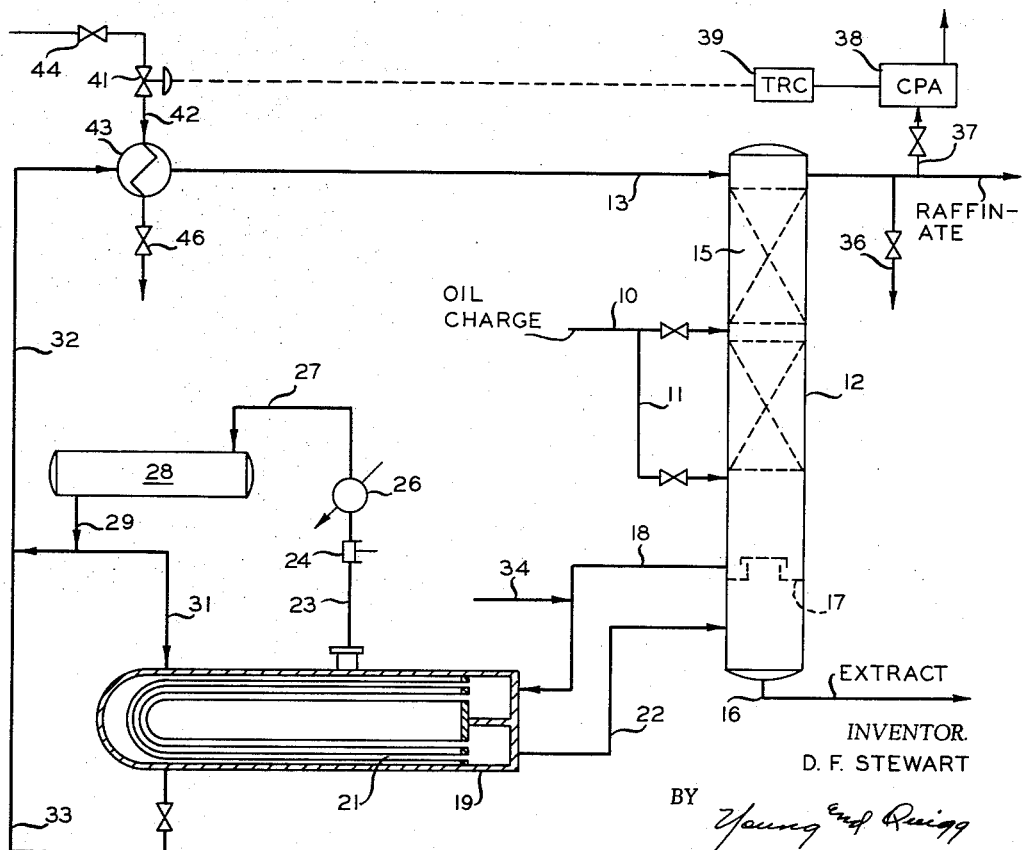
FIGURE 1 is a diagrammatic flow sheet illustrating presently preferred embodiments of the invention.

In FIGURE 1 the operation of a liquid sulfur dioxide extraction unit is illustrated schematically. An oil charge, which can be a cycle oil from a cracking operation, as described, is introduced via conduit 10 or conduit 11 into extraction column 12. Said column 12 is preferably a packed column packed with a suitable packing material 15 such as steel rings, Raschig rings, or other suitable material. However, it is within the scope of the invention to employ other contacting means such as contact trays, etc. If desired, all packing or other contacting means can be omitted but the separation is less efficient. In column 12, said oil, which has been introduced at a locus intermediate the ends of the column, i.e., between the points of withdrawal of raffinate phase and extract phase, is admixed with liquid sulfur dioxide which is charged to an upper portion of the column via conduit 13, forming a raffinate phase and an extract phase. In said column 12, the raffinate phase, consisting essentially of nonaromatic constituents of the cycle oil and a relatively small amount of sulfur dioxide solvent, travels upwardly. This raffinate phase is removed from column 12 via conduit 14. After removal from column 12, the raffinate phase or solution is treated by means not shown, suitably an evaporator means, to recover therefrom the sulfur dioxide contained therein. After removal of said sulfur dioxide, the resulting raffinate oil can then be passed to a catalytic cracking or other hydrocarbon conversion operation.

In said column 12, the extract phase consisting essentially of sulfur dioxide and the aromatic constituents of said cycle oil travels downwardly and is ultimately withdrawn from said column via conduit 16. Said withdrawn extract phase is passed to treating means not shown, suitably an evaporator system, for recovery of sulfur dioxide and an aromatic extract oil product. Provided at a lower portion of said column 12 is a capped draw-off tray 17 from which there can be withdrawn through conduit 18 at least a portion of the extract phase formed in said tower, which extract phase is passed into extract chiller 19 through which it is conducted by means of tubes 21 in said chiller. Said tubes 21 are surrounded by cold liquid sulfur dioxide (or other suitable exchange medium) which serves, by heat transferred through said tubes to chill the extract phase within said tubes. The extract phase thus chilled is returned via conduit 22 to column 12 at a point positioned below draw-off tray 17 but sufficiently above the bottom of column 12 to permit proper conditions of equilibrium to be maintained at said bottom.

Sulfur dioxide vapor is taken off extract chiller 21 via conduit 23, compressor 24, condenser 26, and passed via conduit 27 to sulfur dioxide collector tank 28. From said tank 28, sulfur dioxide is passed via conduits 29 and 31 to extract chiller 19 for reuse. Also, liquid sulfur dioxide is passed from said tank 28 via conduits 29, 32, and 13 into the top of column 12 for use as described above. If desired, cold sulfur dioxide can be withdrawn from the liquid phase in chiller 19 and passed via conduits 33, 32 and 13 to the top of column 12 for use as described.

Sometimes during such an operation when it entails the extraction of a high wax content oil difficulty is encountered due to wax deposition within the tubes 21 of chiller 19. When this occurs an anti-fouling oil can be added to the extract phase prior to chilling same in accordance with the method described in said Hettick patent. This can be conveniently done by introducing said anti-fouling oil via conduit 34, from a source not shown, into conduit 18 at a point just before the extract phase is subjected to the effect of chiller 19. Said anti-fouling oil is added in an amount effective to prevent any substantial deposition of wax or other similar solids within the chiller zone and said amount will generally be less than 15 weight percent of the extract oil yield, preferably not more than about 10 weight percent.

Said anti-fouling oil can be any suitable oil which will not appreciably affect the quality of the extract oil when it is to be an important product of the process or which, should said anti-fouling oil be ultimately in the raffinate oil, will not appreciably affect the quality of said raffinate oil. Oils suitable and which have been employed in actual practice are absorption oils, for example, boiling within the range of about 445 to about 570° F. and having an API gravity of about 39°, polymers produced from kerosene treating, polymers produced from rerun of various clay tower pressure distillate treating operations, diesel fuels, selected fractions of heavy alkylates, etc. In general, said anti-fouling oil will be an oil which is more paraffinic than the extract oil product.

In some instances, a sufficient quantity of the anti-fouling oil will be carried upwardly into the raffinate phase to assert its anti-fouling action in the upper or raffinate phase region of the extraction tower. However, it frequently happens when charging high wax content oils to the extraction tower that said anti-fouling oil will not be effective in the upper or raffinate phase region of the tower. This is believed due to the higher concentration and/or type of wax in the raffinate phase. In other instances, even when it is not necessary to use an anti-fouling oil in the lower or extract phase region of the extraction tower, deposition of wax will occur in the upper or raffinate phase region of the tower when it does not occur in the lower or extract phase region of the tower. Again, this is believed due to the higher concentration and/or type of wax in said raffinate phase.

In such instances I have found, in accordance with the present invention, by withdrawing a sample of the raffinate phase, measuring the cloud point of said sample, and controlling the temperature of the solvent introduced via conduit 13 in accordance with said cloud point measurement, the problem of wax deposition in the raffinate phase region of the tower can be avoided. Preferably, the control of the temperature of the solvent introduced via conduit 13 is carried out by withdrawing a sample of the raffinate phase via conduit 37 and passing same through cloud point analyzer 38. Said cloud point analyzer continuously determines the cloud point of the raffinate phase and delivers a signal in accordance with said cloud point to temperature recorder controller 39 which in turn controls the operation of motor valve 41 in conduit 42 to control the amount of heating medium which is passed through heat exchanger 43 in heat exchange relationship with the liquid solvent in conduits 32 and 13. Any suitable heating medium can be employed in conduit 42. Examples are steam or a hot steam from elsewhere in the unit, e.g., from one of the evaporator systems employed in recovering raffinate or extract oil. Said cloud point analyzer 38 can be any suitable type of such instrument. One convenient type which can be so employed is that described in U.S. Patent 3,031,880, issued May 1, 1962, to R. A. Findlay. Said temperature recorder controller 39 and said control valve 41 are conventional instruments well known to those skilled in the art and operate in conventional manner.

While it is preferred to carry out the control of the temperature of the solvent stream being introduced via conduit 13 in an automatic manner such as the described above, (clearly the method of the invention can be carried out manually by withdrawing a sample of the raffinate phase via conduit 36, determining the cloud point thereof manually by ASTM D 97–57, and controlling the amount of heating medium passed through conduit 42 by suitable adjustment of valves 44 and 46.

Although not shown in FIGURE 1, it is within the scope of the invention to provide tower 12 and chiller 19 with suitable temperature control means for controlling the temperature of the extract phase, similarly as provided for tower 53 and heat exchanger 51 in FIGURE 2, described below.

Figure 2:
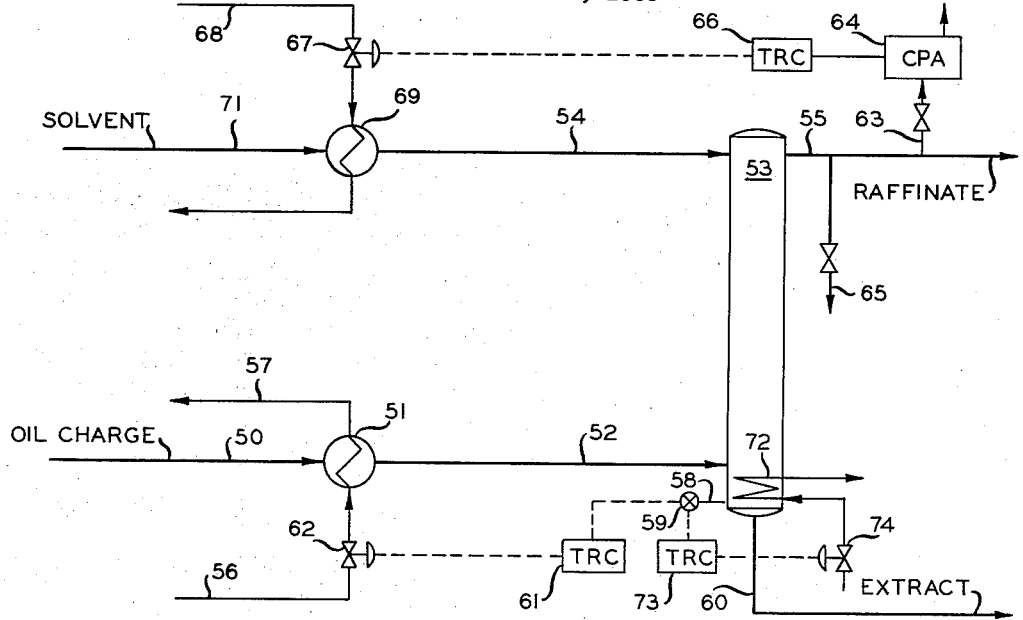
FIGURE 2 is a diagrammatic flow sheet illustrating other embodiments of the invention.

In one embodiment of the solvent extraction system illustrated in FIGURE 2, the oil charge in conduit 50 is passed through heat exchanger 51 and introduced via conduit 52 into extraction tower 53. In said tower 53 said oil is contacted countercurrently with a selective solvent introduced via conduit 54. A raffinate phase is withdrawn via conduit 55 for recovery of raffinate product therefrom. An extract phase is withdrawn via conduit 60 for recovery of extract product therefrom.

In this embodiment of the invention when it is desired to cool the extract phase region of the tower, a cooling medium is passed via conduit 56 into indirect heat exchange with the oil charge in heat exchanger 51, and removed from said heat exchanger via conduit 57. The temperature within the extract phase region of the column is determined by means of the thermocouple 58 extending into said column and connected to transmitter 59 which transmits a signal to temperature recorder controller 61 which in turn operates motor valve 62 to control the amount of cooling medium passed through said conduit 56. In this manner the temperature within the extract phase region of the tower can be maintained at the desired level.

When it is desired to control and maintain the maximum temperature differential between the lower or extract phase region of the tower and the upper or raffinate phase region of the tower, a sample of the raffinate phase is withdrawn via conduit 63 and passed through cloud point analyzer 64. Said cloud point analyzer transmits a signal in accordance with the cloud point measurement to temperature recorder controller 66 which controls the operation of motor valve 67 in heating fluid conduit 68. The heating fluid in said conduit 68 is passed in indirect heat exchange in heat exchanger 69 with solvent from conduit 71 and the temperature of the solvent in conduit 54 is controlled in a manner similar to that described above in connection with FIGURE 1.

In another embodiment of the invention which is also illustrated in FIGURE 2, the extract phase region of the tower is cooled by means of a cooling medium passed through coil 72 situated in the lower region of the tower. The amount of said cooling medium passed through said coil 72 can be controlled in accordance with the temperature in the extract phase or lower region of the tower by means of temperature transmitter 59, temperature recorder controller 73 and motor valve 74, similarly as previously described. The embodiments of the invention illustrated in FIGURE 2 are particularly adapted for use in the situations wherein the oil charge being extracted is of low wax content and problems of wax deposition in the extract region of the tower are not encountered. Although not illustrated in FIGURE 2, it is within the scope of the invention to employ an anti-fouling oil similarly as in FIGURE 1.

The following examples will serve to further illustrate the invention.

EXAMPLE I

A high wax content heavy cycle oil, boiling range 620° F. IBP to 766° F. (70% point), obtained from the fluid catalytic cracking of a topped crude oil, and having a cloud point of 60° F. is charged to a solvent extraction unit embodying the essential features of a unit such as that illustrated in FIGURE 2. Said oil is introduced via conduit 52 into extraction tower 53 and therein contacted countercurrently with liquid sulfur dioxide solvent introduced into said tower via conduit 54. It is desired to produce an aromatic extract oil having a BMCI of 85. To do this it is found necessary to operate the tower with a bottom temperature of 83° F. in order to obtain the desired solvent selectivity. It is found during operation that wax deposition is occurring in the upper region of the tower. A check on the raffinate solution withdrawn through sample conduit 65 shows that the cloud point of the raffinate phase is 92° F., two degrees above the top tower temperature of 90° F. The temperature of the solvent being introduced via conduit 54 is then increased to 94° F. by controlling the amount of steam passed via conduit 68 through heat exchanger 69. In this manner the deposition of wax in the raffinate phase region of tower 53 is prevented.

After successful operation on hand control as described above, the automatic control system comprising cloud point analyzer 63, temperature recorder controller 66, and motor valve 67 is installed and control of the temperature of the solvent introduced via conduit 54 is accomplished automatically responsive to or in accordance with the cloud point measurement determined by cloud point analyzer 64 to maintain the temperature of the introduced solvent in conduit 54 above the cloud point of the raffinate phase. Charge rates and operating conditions are set forth in Table I below.

EXAMPLE II

A low wax content cycle oil, boiling range 530° F. to 710° F., obtained from the fluid catalytic cracking of a gas oil and having a cloud point of 25° F. is charged via conduit 11 to a solvent extraction tower 12 of a unit embodying the essential features of the unit illustrated in FIGURE 1 and therein contacted countercurrently with liquid sulfur dioxide introduced to said tower via conduit 13. In this run it is desired to produce an aromatic extract oil having a BMCI of 87. To do this it is found necessary, in order to obtain the desired solvent selectivity, to operate said tower 12 with a bottom temperature of 43° F. In the operation of the tower, no difficulties are encountered due to wax deposition in the extract phase region of the tower. However, wax deposition problems are encountered in the raffinate phase region of the tower. A check of a sample of the raffinate phase withdrawn via conduit 36 shows the cloud point thereof to be 56° F., two degrees above the top tower temperature of 54° F. It is found that by employing cloud point analyzer 38, temperature recorder controller 39, and motor valve 41 to control the amount of heating medium being passed via conduit 42 through heat exchanger 43, the temperature of the solvent being introduced via conduit 13 can be maintained at 58° F. and wax deposition problems in the raffinate region of said tower are eliminated. Charge rates and operating conditions are set forth in Table I below.

EXAMPLE III

In another run the low wax content cycle oil of Example II is charged via conduit 11 to solvent extraction tower 12 of FIGURE 1 and therein contacted countercurrently with liquid sulfur dioxide introduced to said tower via conduit 13. In this run it is desired to produce an aromatic extract oil having a BMCI of 90. To do this it is found necessary, in order to obtain the desired solvent selectivity, to operate said tower 12 with a bottom temperature of 38° F. To obtain said bottom tower temperature, extract phase is withdrawn via conduit 18, passed through tubes 21 of chiller 19 and returned to the lower end portion of said tower 12 via conduit 22 at a temperature of 34° F. During the operation it is noted that wax deposition is occurring in said chiller tubes 21 and is also occurring in the upper or raffinate phase region of the tower, including packed region 15. It is found that by the introduction of an anti-fouling oil comprising an absorption oil having a gravity of about 39.2° API and boiling in the range of 445 to 570° F. from conduit 34 into said conduit 18 the problem of wax deposition in said chiller tubes 21 is eliminated.

However, wax deposition continues to occur in said packed region 15 and the raffinate phase region of said tower thereabove. A check of a sample of the raffinate phase withdrawn via conduit 36 shows the cloud point of said raffinate phase to be 56° F., two degrees above the top tower temperature of 54° F. It is found that by employing cloud point analyzer 38, temperature recorder controller 39, and motor valve 41 to measure the cloud point of said raffinate phase sample and control the amount of heating medium being passed via conduit 42 through heat exchanger 43, the temperature of the solvent being introduced via conduit 13 can be maintained at 57° F., one degree above said raffinate phase cloud point of 56° F., and wax deposition problems in the raffinate region of said tower are eliminated. Charge rates and operating conditions are set forth in Table I below.

Table I

|  | Example I | | Example II | | Example III | |
|---|---|---|---|---|---|---|
| Oil Charge: | | | | | | |
| Feed rate, b./h | 830 | | 900 | | 900 | |
| Cloud point, °F | 60 | | 25 | | 25 | |
| Pour point, °F | 50 | | 15 | | 15 | |
| Viscosity, SUS @ 100° F | 48.0 | | 39.5 | | 39.5 | |
| Solvent, feed rate, b./h | 625 | | 625 | | 625 | |
| Raffinate yield, b./h | 625 | | 648 | | 673 | |
| LV percent of oil feed | 75.3 | | 72.0 | | 74.8 | |
| Extract yield, b./h | 205 | | 252 | | 242 | |
| LV percent of oil feed | 24.7 | | 28.0 | | 26.9 | |
| Anti-fouling oil, rate b./h | 0 | | 0 | | 10 | |
| Tower Conditions: | A* | B* | A* | B* | A* | B* |
| Top, °F | 90 | 94 | 54 | 58 | 54 | 57 |
| Bottom, °F | 83 | 83 | 43 | 43 | 38 | 38 |
| Draw-off tray, °F | | | 52 | 52 | 50 | 50 |
| Return from chiller, °F | | | 40 | 40 | 34 | 34 |
| Raffinate phase, cloud pt., °F | 92 | 92 | 56 | 56 | 56 | 56 |
| Extract oil, BMCI | 85 | 85 | 87 | 87 | 90 | 90 |
| Solvent feed, temp., °F | 90 | 94 | 54 | 58 | 54 | 57 |
| Solids deposition in raffinate phase region of tower | Yes | No | Yes | No | Yes | No |

*A=conditions during initial portion of run; B=conditions during final portion of run.

From the above examples it is clear that the invention provides a method and means for maintaining the proper maximum temperature differential between the upper or raffinate phase region and the lower or extract phase region of a solvent extraction tower, and thus maintain maximum solvent selectivity and efficiency of the solvent extraction operation. Prior to this invention it was necessary to operate the upper or raffinate phase region of the tower, at least, and sometimes the entire tower, at higher temperatures than desirable. This has resulted in loss of extract to the raffinate with degradation of said raffinate and loss of valuable extract.

The BMCI referred to in the above examples is a correlation index developed by the Bureau of Mines and is employed to denote aromaticity of an oil; a higher numerical index denoting a more aromatic oil. The index is calculated from the formula $$C.I. = \frac{48640}{K} + 473.7G - 456.8$$

where:

C.I.=Bureau of Mines correlation index
K=Average boiling point (°K.)
G=Specific gravity @ 60° F./60° F.

While the invention has been described with respect to the use of sulfur dioxide as the extraction or selective solvent, it is not intended to limit the invention to the use of sulfur dioxide, and it is clear that other solvents can be employed. One skilled in the art can readily determine the suitability of any particular solvent by mere routine tests. Thus, any suitable polar selective solvent such as furfural, phenol, etc. can be employed in the practice of this invention. Also, solvents having a density less than the feed can be employed. In such instances, the extract phase is removed from the top of the extraction column. Therefore, in practice, the invention is not limited to any particular solvent.

Likewise, the invention is not to be limited to any specific operating conditions in the solvent extraction system. It will be clear to those skilled in the art in view of this disclosure that the particular operating conditions employed in the extraction tower and other units of the system will depend upon the type of oil being extracted, the particular solvent employed, and the separation it is desired to effect.

While the invention has been described with particular reference to the extraction of hydrocarbon oils, such as cycle oils, it is not intended to limit the invention to the extraction of such oils. The invention can be employed in the extraction of other materials wherein the deposition of a solid material, either in the raffinate phase region or the extract phase region of a column, is a problem.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A solvent extraction operation which comprises: introducing an oil into a solvent extraction zone; introducing a selective solvent into said zone; forming in said zone and withdrawing therefrom a raffinate phase and an extract phase; measuring the cloud point of said raffinate phase; and controlling the temperature of said introduced selective solvent responsive to said cloud point measurement to be above the cloud point of said raffinate phase.

2. In a solvent extraction operation wherein, an oil to be extracted is introduced into a solvent extraction zone, a selective solvent is introduced into said zone, a raffinate phase and an extract phase are formed in and withdrawn from opposite end portions of said zone, the improvement which comprises: measuring the cloud point of said raffinate phase; and controlling the temperature of said introduced selective solvent, responsive to said cloud point measurement, to be above the cloud point of said raffinate phase.

3. In a solvent extraction operation wherein an oil to be extracted is introduced into an intermediate portion of a solvent extraction zone; a selective solvent is introduced into one end portion of said zone; a raffinate phase and an extract phase are withdrawn from opposite end portions, respectively, of said zone; a temperature differential is maintained between said opposite end portions of said zone; and deposition of hydrocarbon solids occurs in the raffinate phase end portion of said zone, the improvement which comprises: measuring the cloud point of said withdrawn raffinate phase; and maintaining the temperature of said introduced selective solvent at a temperature above said cloud point responsive to said cloud point measurement.

4. A solvent extraction operation according to claim 3 wherein said solvent is liquid sulfur dioxide.

5. In the operation of a selective solvent extraction system, in which an oil to be extracted is introduced into an intermediate portion of a solvent extraction zone; a selective solvent is introduced into one end of said zone; a raffinate phase and an extract phase are removed from opposite ends, respectively, of said zone; a temperature differential is maintained between said ends of said zone by lowering the temperature of said extract phase in said zone; and deposition of hydrocarbon solids occurs in the raffinate phase portion of said zone, the improvement comprising: measuring the cloud point of said withdrawn raffinate phase; and maintaining the temperature of said introduced selective solvent at a temperature above said cloud point responsive to said cloud point measurement.

6. In the operation of a selective solvent extraction in which an oil containing selectively extractable aromatic constituents is introduced into an intermediate portion of a solvent extraction zone; a selective solvent is introduced into an upper portion of said zone; a raffinate phase is removed from an upper portion of said zone; an extract phase is removed from a lower portion of said zone; a temperature differential is maintained between said upper and lower portions of said zone by cooling said extract phase, an anti-fouling oil is admixed with said extract phase prior to cooling same so as to prevent a solid hydrocarbon deposit in the zone in which the temperature of said extract phase is reduced; and deposition of hydrocarbon solids occurs in the raffinate phase portion of said zone; the improvement comprising: measuring the cloud point of said raffinate phase; and maintaining the temperature of said introduced solvent at a temperature above said cloud point responsive to said cloud point measurement.

7. A process in which a cycle oil obtained from a catalytic cracking of hydrocarbon oil is treated to recover aromatics therefrom, which process comprises: passing said oil into an intermediate portion of a solvent extraction zone; introducing a selective solvent into an upper portion of said zone and in said zone contacting said oil with said solvent under extraction conditions to produce an upper raffinate phase rich in paraffinic constituents and a lower extract phase rich in aromatic constituents; removing at least a portion of said extract phase from said solvent extraction zone; admixing an anti-fouling oil with said removed portion of extract phase; chilling the admixture of extract phase and anti-fouling oil thus obtained; returning said chilled admixture to the lower portion of said solvent extraction zone; removing a sample of said raffinate phase and measuring the cloud point thereof; maintaining the temperature of said introduced solvent at a temperature above said raffinate phase cloud point responsive to said cloud point measurement; and recovering said raffinate phase and said extract phase as products of the process.

8. A process according to claim 7 wherein said selective solvent is liquid sulfur dioxide.

9. A selective solvent extraction system comprising, in combination: a solvent extraction vessel; a conduit in communication with an intermediate portion of said vessel for feeding an oil to be treated thereinto; a conduit at the upper end portion of said vessel for removing raffinate phase therefrom; a conduit at the bottom end portion of said vessel for removing extract phase therefrom; a conduit at the upper portion of said vessel for introducing selective solvent thereinto, the solvent conduit being at a point below said conduit for removal of raffinate phase from said vessel; means in communication with said raffinate phase removal conduit for measuring the cloud point of said raffinate phase; and means for maintaining the temperature of said introduced selective solvent at a temperature above said raffinate phase cloud point responsive to said cloud point measurement.

10. A selective solvent extraction system comprising, in combination: a solvent extraction vessel; a conduit in communication with an intermediate portion of said vessel for feeding an oil to be treated thereinto; a conduit at the upper end portion of said vessel for removing raffinate phase therefrom; a conduit at the bottom end portion of said vessel for removing extract phase therefrom; a conduit at the upper portion of said vessel for introducing selective solvent thereinto, the solvent conduit being at a point below said conduit for removal of raffinate phase from said vessel; heat exchange means in said solvent conduit; a cloud point analyzer; a conduit communicating with said cloud point analyzer and said raffinate phase removal conduit; a heat exchange medium conduit in communication with said heat exchange means for passing heat exchange medium in indirect heat exchange with said selective solvent in said solvent conduit; a motor valve in said heat exchange medium conduit; and a temperature recorder controller operatively connected to said cloud point analyzer and said motor valve.

11. A selective solvent extraction system comprising, in combination: a solvent extraction vessel; a conduit in communication with an intermediate portion of said vessel for feeding an oil to be treated thereinto; a conduit at the upper end portion of said vessel for removing raffinate phase therefrom; a conduit at the bottom end portion of said vessel for removing extract phase therefrom; a conduit at the upper portion of said vessel for introducing selective solvent thereinto, the solvent conduit being at a point below said conduit for removal of raffinate phase from said vessel; heat exchange means in said solvent conduit; a draw-off tray intermediate the conduit for introducing oil into said vessel and the bottom thereof, said tray being adapted to collect an extract phase traveling downwardly in said vessel; an extract chiller vessel; a conduit communicating with said draw-off tray and with said extract chiller vessel; a passageway through said extract chiller, communicating with said last mentioned conduit; a conduit communicating with said passageway through said extract chiller and with said vessel at a point below said draw-off tray, for returning chilled extract phase to said solvent extraction vessel; a conduit in communication with said conduit communicating said draw-off tray and said passageway in said extract chiller for introducing an oil into said extract phase before it passes into said extract chiller; a cloud point analyzer; a conduit communicating with said cloud point analyzer and said raffinate phase removal conduit; a heat exchange medium conduit in communication with said heat exchange means for passing heat exchange medium in indirect heat exchange with said selective solvent in said solvent conduit; a motor valve in said heat exchange medium conduit; and a temperature recorder controller operatively connected to said cloud point analyzer and said motor valve.

References Cited by the Examiner

UNITED STATES PATENTS

| | | | |
|---|---|---|---|
| 2,674,563 | 4/1954 | Findlay | 208—320 |
| 2,737,469 | 3/1956 | Anderson et al. | 196—14.52 |
| 2,764,522 | 9/1956 | Hettick | 208—320 |
| 3,031,880 | 5/1962 | Findlay | 73—17 |

DELBERT E. GANTZ, *Primary Examiner.*

ALPHONSO D. SULLIVAN, *Examiner.*

H. LEVINE, *Assistant Examiner.*